United States Patent
Ramos Valencia et al.

(10) Patent No.: US 9,764,662 B1
(45) Date of Patent: Sep. 19, 2017

(54) VEHICLE SEAT ASSEMBLY WITH INTEGRAL CHILD SEAT MODULE

(71) Applicant: FORD GLOBAL TECHNOLOGIES, LLC, Dearborn, MI (US)

(72) Inventors: Ricardo Ramos Valencia, Mexico City (MX); Francisco Javier Quintero Perez, Uruapan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/070,666

(22) Filed: Mar. 15, 2016

(51) Int. Cl.
*B60N 2/30* (2006.01)
*B60N 2/26* (2006.01)
*B60N 2/28* (2006.01)
*B60N 2/32* (2006.01)
*B60R 22/10* (2006.01)
*B60R 22/34* (2006.01)

(52) U.S. Cl.
CPC ........... *B60N 2/265* (2013.01); *B60N 2/2866* (2013.01); *B60N 2/32* (2013.01); *B60R 22/105* (2013.01); *B60R 22/34* (2013.01)

(58) Field of Classification Search
CPC ........ B60N 2/2866; B60N 2/32; B60N 2/265; B60R 22/105; B60R 22/34
USPC .......................................................... 297/238
See application file for complete search history.

(56) References Cited

U.S. PATENT DOCUMENTS

| | | | | |
|---|---|---|---|---|
| 4,540,216 A * | 9/1985 | Hassel, Sr. | ........... | B60N 2/3084 297/238 X |
| 4,749,229 A * | 6/1988 | Dorto | ....................... | B60N 2/286 297/238 X |
| 4,756,573 A * | 7/1988 | Simin | ................... | B60N 2/3084 297/238 X |
| 4,943,112 A * | 7/1990 | Law | ....................... | B60N 2/3084 297/238 X |
| 4,986,600 A * | 1/1991 | Leblanc | ................ | B60N 2/3084 297/238 X |
| 5,026,118 A * | 6/1991 | Vander Stel | ......... | B60N 2/3084 297/238 |
| 5,100,199 A * | 3/1992 | Vander Stel | ......... | A61K 31/155 297/238 |
| 5,106,158 A * | 4/1992 | Dukatz | ................ | B60N 2/3084 297/238 X |
| 5,161,855 A * | 11/1992 | Harmon | ................ | B60N 2/3084 297/238 |
| 5,205,608 A * | 4/1993 | Stig | ....................... | B60N 2/3084 297/238 X |

(Continued)

FOREIGN PATENT DOCUMENTS

JP 6135274 A 5/1994

OTHER PUBLICATIONS

English machine translation of JP6135274A, May 17, 1994.

(Continued)

*Primary Examiner* — Rodney B White
(74) *Attorney, Agent, or Firm* — Vichit Chea; King & Schickli, PLLC

(57) ABSTRACT

A vehicle seat assembly is provided for a motor vehicle. The vehicle seat assembly includes a vehicle seat having a seat back and a seat bottom as well as a child seat module integrally formed with the seat back. The child seat module includes a folding frame member, an anchor system for securing the folding member in a deployed position and a child restraint system.

19 Claims, 6 Drawing Sheets

(56) References Cited

U.S. PATENT DOCUMENTS

| | | | | |
|---|---|---|---|---|
| 5,224,756 A | * | 7/1993 | Dukatz | B60N 2/3084 297/238 X |
| 5,280,995 A | * | 1/1994 | Elton | B60N 2/3084 297/238 X |
| 5,282,667 A | * | 2/1994 | Elton | B60N 2/3084 297/238 |
| 5,282,668 A | * | 2/1994 | Heussner | B60N 2/3084 297/238 X |
| 5,286,084 A | * | 2/1994 | Bart | B60N 2/3084 297/238 X |
| 5,290,090 A | * | 3/1994 | Bell | B60N 2/36 297/238 |
| 5,312,156 A | * | 5/1994 | Heussner | B60N 2/3084 297/238 X |
| 5,332,284 A | * | 7/1994 | Elton | B60N 2/3084 297/238 |
| 5,366,270 A | * | 11/1994 | Heussner | B60N 2/3084 297/238 |
| 5,380,060 A | * | 1/1995 | Sponsler | B60N 2/3084 297/238 |
| 5,383,707 A | * | 1/1995 | Osenkowski | B60N 2/3084 297/238 |
| 5,385,384 A | * | 1/1995 | Gierman | B60R 22/105 297/238 X |
| 5,398,997 A | * | 3/1995 | McFalls | B60R 22/357 297/484 X |
| 5,403,068 A | * | 4/1995 | Fatchett | B60N 2/2352 297/238 |
| 5,429,414 A | * | 7/1995 | Olsson | B60N 2/3084 297/238 X |
| 5,449,216 A | | 9/1995 | Gierman et al. | |
| 5,449,223 A | * | 9/1995 | Miculici | B60R 22/20 297/238 X |
| 5,468,046 A | * | 11/1995 | Weber | B60R 22/105 297/238 X |
| 5,472,260 A | * | 12/1995 | Czapski | B60N 2/3084 297/238 X |
| 5,476,305 A | * | 12/1995 | Corkins | B60N 2/36 297/238 X |
| 5,498,062 A | * | 3/1996 | Holdampf | B60N 2/3084 297/238 X |
| 5,503,461 A | * | 4/1996 | Schreier | B60N 2/3084 297/484 X |
| 5,529,381 A | * | 6/1996 | Zhao | B60R 22/3405 297/238 |
| 5,564,780 A | * | 10/1996 | Presser | B60N 2/2878 297/238 |
| 5,568,959 A | * | 10/1996 | Weber | B60N 2/4613 297/238 |
| 5,588,700 A | * | 12/1996 | Homier | B60N 2/3084 297/238 X |
| 5,603,550 A | * | 2/1997 | Holdampf | B60N 2/3013 297/238 X |
| 5,611,603 A | * | 3/1997 | Gray | B60R 22/105 297/238 X |
| 5,639,144 A | * | 6/1997 | Naujokas | B60N 2/2827 297/238 X |
| 5,653,504 A | | 8/1997 | Henson | |
| 5,662,377 A | * | 9/1997 | Holdampf | B60N 2/3013 297/238 X |
| 5,700,054 A | * | 12/1997 | Lang | B60N 2/3084 297/238 X |
| 5,704,684 A | * | 1/1998 | Dukatz | B60N 2/3084 297/238 |
| 5,704,685 A | * | 1/1998 | Handa | B60N 2/3084 297/238 |
| 5,716,097 A | * | 2/1998 | Peck | B60N 2/3084 297/238 |
| 5,743,593 A | * | 4/1998 | Vogt | B60N 2/3084 297/238 |
| 5,788,326 A | * | 8/1998 | Kawade | B60N 2/2812 297/238 X |
| 5,806,926 A | * | 9/1998 | Parsons | B60N 2/3081 297/238 X |
| 5,899,534 A | * | 5/1999 | Gray | B60N 2/3084 297/238 |
| 6,048,027 A | * | 4/2000 | Peck | B60N 2/3084 297/238 |
| 6,089,662 A | * | 7/2000 | Lambert | B60N 2/3084 297/238 |
| 6,220,665 B1 | * | 4/2001 | Dingel | B60N 2/01583 297/238 X |
| 6,769,735 B1 | * | 8/2004 | Winkler | B60N 2/3084 297/238 X |
| 7,029,067 B2 | * | 4/2006 | Vits | B60N 2/688 297/238 X |
| 7,070,239 B1 | * | 7/2006 | Ugrekhelidze | B60N 2/3086 297/238 X |
| 7,178,865 B2 | * | 2/2007 | Yetukuri | B60N 2/4613 297/238 X |
| 7,458,634 B2 | * | 12/2008 | Schlecht | B60N 2/4613 297/238 X |
| 7,517,016 B1 | * | 4/2009 | West | B60N 2/3086 297/232 |
| 7,997,647 B2 | * | 8/2011 | Sjoquist | B60N 2/14 297/238 |
| 8,622,468 B2 | * | 1/2014 | Masuda | B60N 2/66 297/238 X |
| 9,227,535 B2 | * | 1/2016 | Coman | B60N 2/3084 |
| 2002/0030394 A1 | * | 3/2002 | Ito | B60N 2/3084 297/238 X |
| 2007/0069561 A1 | * | 3/2007 | Schnabel | B60N 2/4613 297/238 |
| 2015/0130235 A1 | * | 5/2015 | Herut | B60N 2/2878 297/238 |

OTHER PUBLICATIONS

"SafeGuard ICS"; IMMI; http://www.imminet.com/products/school-bus-integrated-child-seats/; 2016; p. 1 of 1.

Alex R; "Saab, always looking to the future and getting there first"; Saabtala, blog(at)saabtala.co.uk; http://www.saabtala.com/saab-always-looking-to-the-future-and-getting-there-first/; Mar. 25, 2015; pp. 1-4.

\* cited by examiner

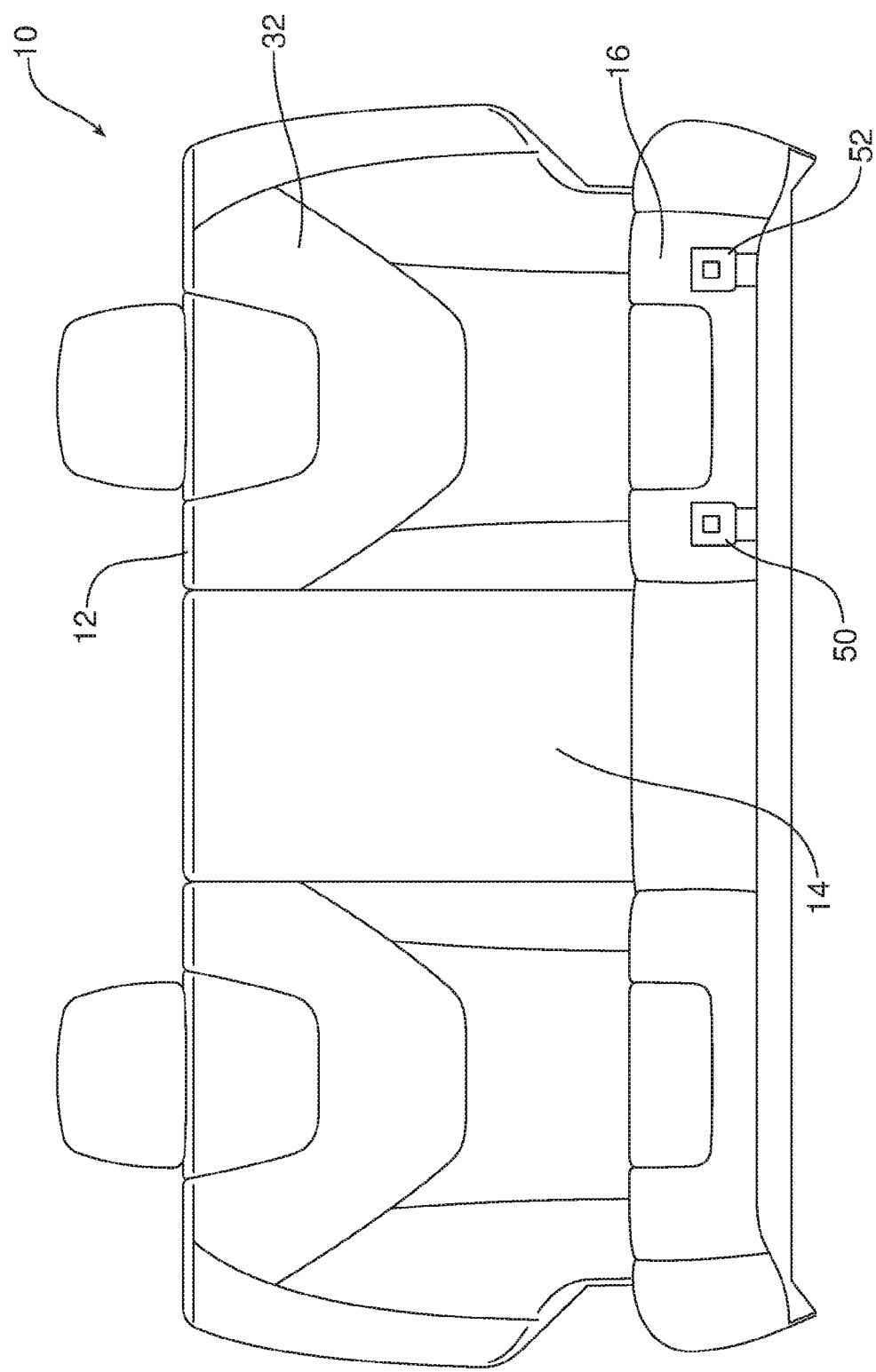

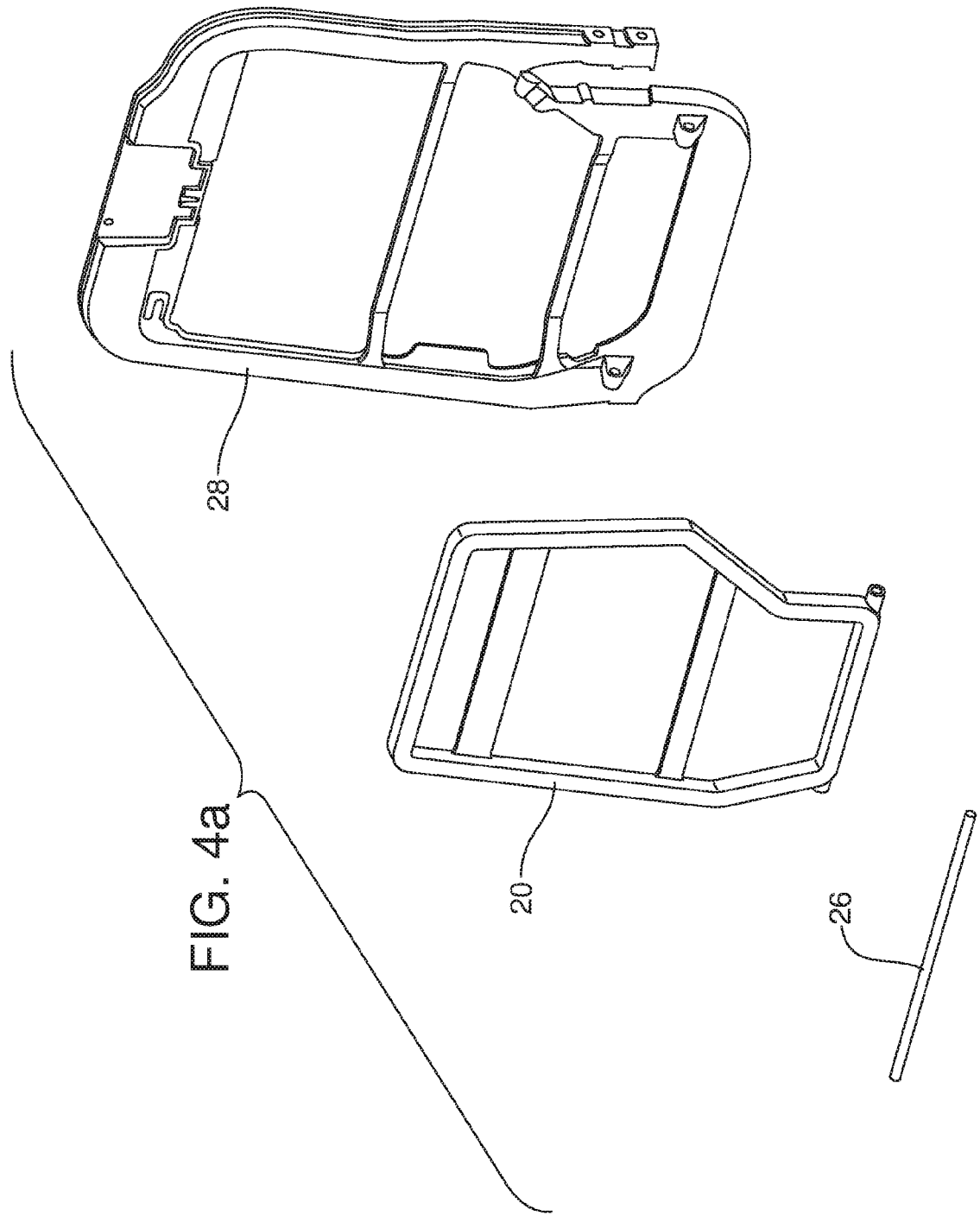

VEHICLE SEAT ASSEMBLY WITH INTEGRAL CHILD SEAT MODULE

TECHNICAL FIELD

This document relates generally to the motor vehicle equipment field and, more particularly, to a vehicle seat assembly incorporating an integral child seat module for safely restraining a child.

BACKGROUND

A need exists for a vehicle seat assembly incorporating an integral child seat module which may be easily deployed and utilized to restrain a child in a motor vehicle. Advantageously, the child seat module may also be conveniently stowed within the vehicle seat assembly in a quick and efficient manner. The device eliminates the need to purchase a separate child restraint seat. Such a separate seat is often heavy and difficult to install. It also must be removed from the vehicle at other times in order to gain space for non-child passengers and, consequently is often inconvenient to use. The vehicle seat assembly disclosed in this document addresses and resolves these issues for the benefit of the vehicle operator.

SUMMARY

In accordance with the purposes and benefits described herein, a vehicle seat assembly is provided for a motor vehicle. That vehicle seat assembly comprises a vehicle seat, including a seat back and a seat bottom, and a child seat module integrally formed with the seat back. The child seat module includes a folding frame member, an anchor system for securing the folding frame member in a deployed position and a child restraint system for safely restraining a child in the child seat module.

The vehicle seat may include a main frame with the folding frame member attached by a pivot to the main frame. Further, the child seat module may include a stationary child seat back carried on the main frame.

Still further, the seat back may include a section carried on a first side of the folding frame member while the child seat module includes a child seat bottom carried on a second side of the folding frame member.

The anchor system includes at least one tie down. The at least one tie down may include a length of webbing. A tongue is secured to a first end of the webbing and a buckle assembly is carried on a body or a frame of the motor vehicle. The tongue is secured in the buckle assembly to secure the folding frame member in the deployed position for holding a child.

The child seat module may include a retractor. In such an embodiment, the webbing has a second end secured to the retractor and the webbing is automatically wound onto the retractor when disconnected from the buckle assembly.

In addition, the child restraint system may include a shoulder harness.

In one particularly useful embodiment, the anchor system includes a first length of webbing, a second length of webbing, a first tongue connected to a first end of the first length of webbing and a second tongue connected to a first end of the second length of webbing. Further, the anchor system includes first and second buckle assemblies carried on a body or a frame of the motor vehicle. The first tongue is secured in the first buckle assembly and the second tongue is secured in the second buckle assembly to secure the folding frame member in the deployed position holding a child. In such an embodiment the child seat module also includes first and second retractors. The first length of webbing is automatically wound onto the first retractor when disconnected from the first buckle assembly. Similarly, the second length of webbing is automatically wound onto the second retractor when disconnected from the second buckle assembly.

In accordance with still another aspect, a method is provided for restraining a child in a motor vehicle seat. That method comprises the steps of: (a) folding a portion of a motor vehicle seat back downward to a deployed position in order to expose a child seat, (b) anchoring that portion in the deployed position, (c) placing a child in the exposed child seat and (d) restraining the child in the child seat.

The method may further include the step of extending a first length of webbing from a first retractor carried on the folding portion of the motor vehicle seat back and inserting a first tongue of a first end of the first length of webbing into a first buckle assembly anchored to a body or a frame of the motor vehicle. Still further the method may include the step of extending a second length of webbing from a second retractor carried on the folding portion of the motor vehicle seat back and inserting a second tongue on a first end of the second length of webbing into a second buckle assembly anchored to the body or frame of the motor vehicle.

In the following description, there are shown and described several preferred embodiments of the vehicle seat assembly. As it should be realized, the vehicle seat assembly is capable of other, different embodiments and its several details are capable of modification in various, obvious aspects all without departing from the vehicle seat assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle seat assembly and together with the description serve to explain certain principles thereof. In the drawing figures:

FIG. 3 is a front elevational view of the vehicle seat assembly with the child module in the stowed position.

FIG. 4a is a an exploded perspective view of a portion of the main frame, the folding frame member of the child seat module and the axle that pivotally mounts that folding frame member to the main frame.

Reference will now be made in detail to the present preferred embodiments of the vehicle seat assembly, examples of which are illustrated in the accompanying drawing figures.

DETAILED DESCRIPTION

Figure 1:
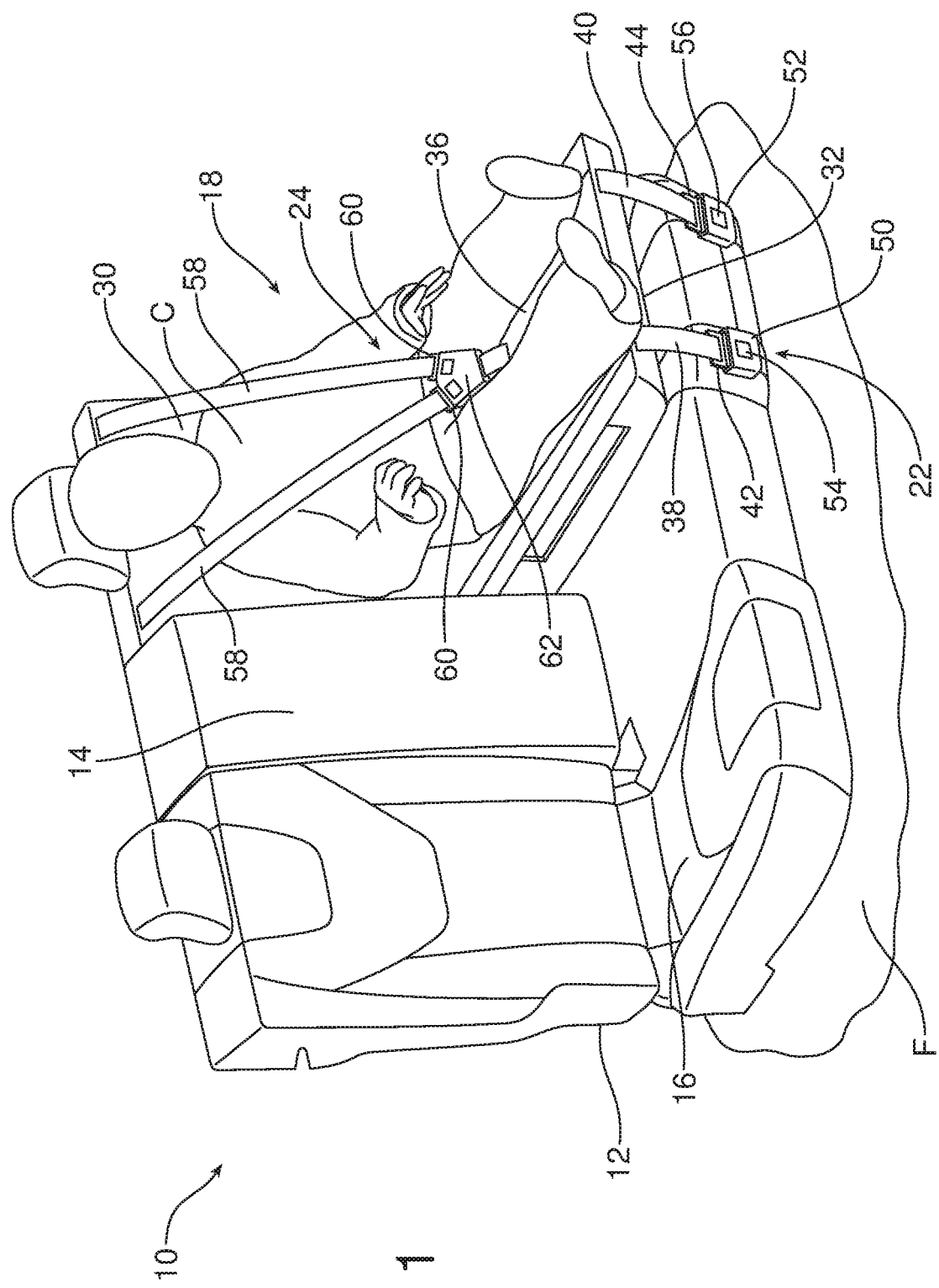
FIG. 1 is a perspective view of the vehicle seat assembly with the child seat module in the deployed position and a child restrained in the child seat module.

Reference is now made to FIGS. 1-4c illustrating the vehicle seat assembly 10 for use in a motor vehicle. As illustrated, the vehicle seat assembly 10 includes vehicle seat 12 including a seat back 14 and a seat bottom 16. In addition, the vehicle seat assembly 10 includes a child seat module generally designated by reference numeral 18, that is integrally formed with the seat back 14. The child seat module 18 includes a folding frame member 20, an anchor system, generally designated by reference numeral 22, for securing the folding frame member in a deployed position as illustrated in FIG. 1 and a child restraint system generally designated by reference numeral 24.

Figure 4B:
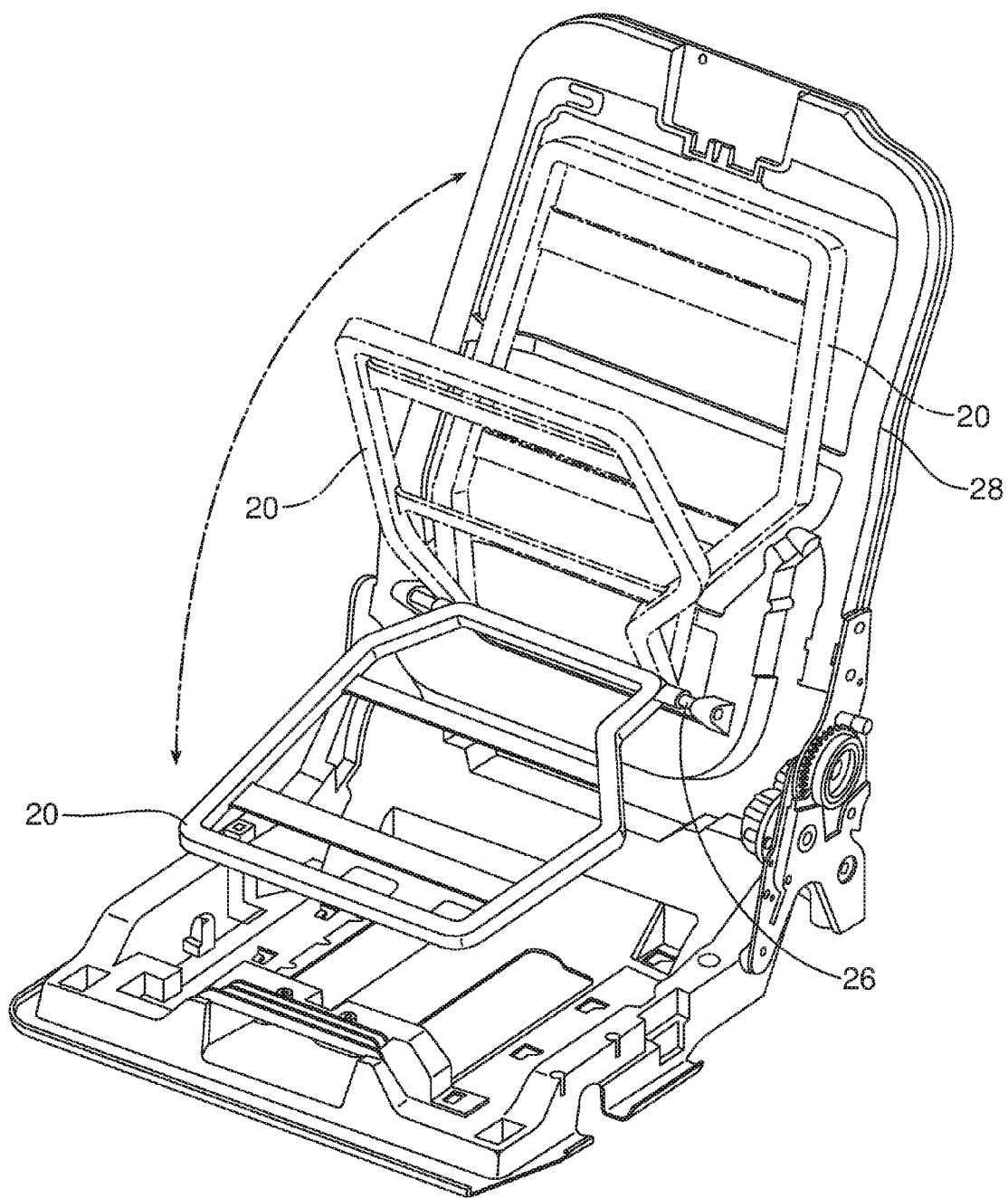
FIG. 4b is a perspective view of the folding frame member assembled to the main frame that illustrates the folding frame member in the home, partially deployed and fully deployed positions.

As illustrated in FIG. 1, the child restraint system 24 is utilized to secure a child C in the child seat module 18. As illustrated in FIG. 4a, the folding frame member 20 of the child seat module 18 is pivotally secured by means of the axle 26 to a portion of the main frame 28 that supports the seat back 14. FIG. 4b illustrates how the folding frame member 20 is pivoted with respect to the main frame 28 when the child seat module 18 is displaced between the stowed, upright position concealed within the seat back 14 as illustrated in FIG. 3 and the fully deployed position illustrated in FIG. 1.

Figure 2:
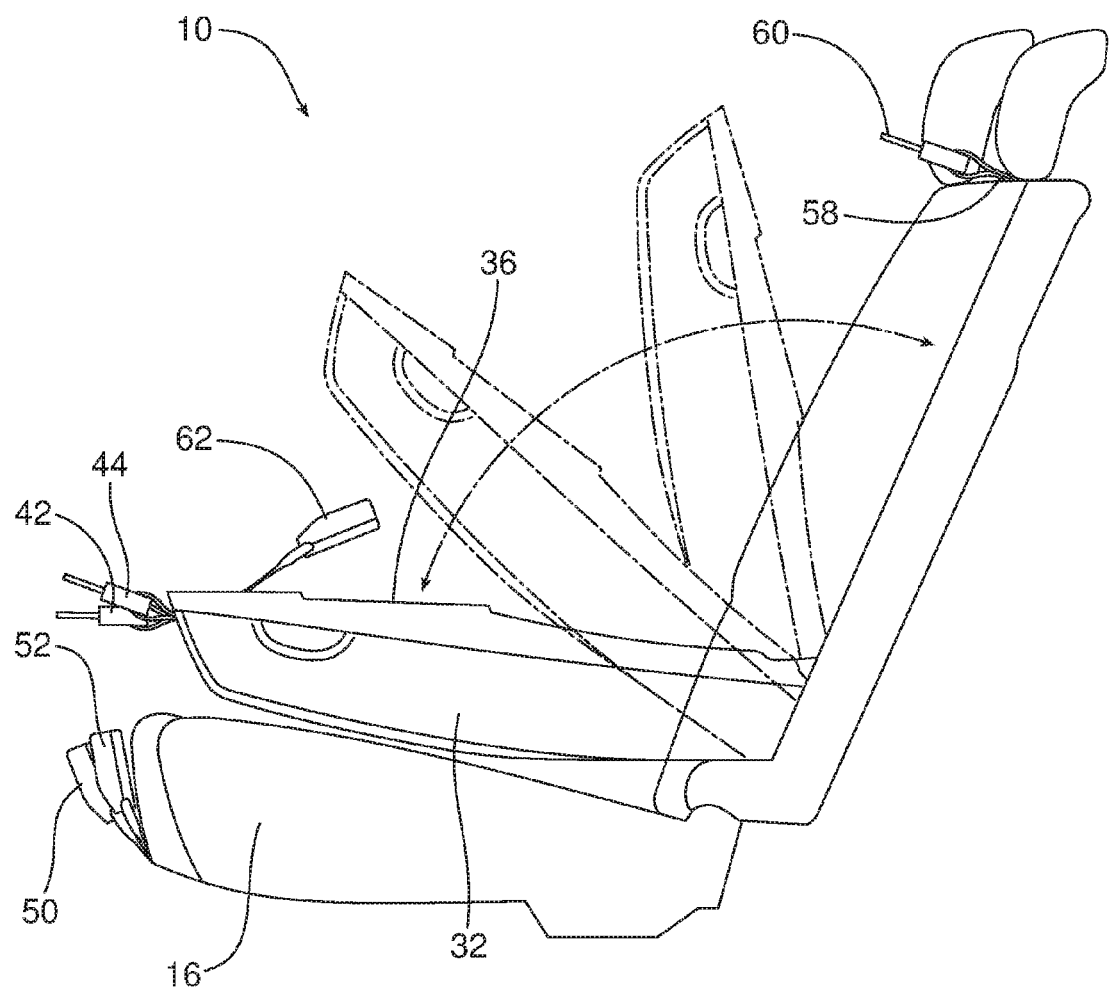
FIG. 2 is a side elevational view of the vehicle seat assembly illustrated in FIG. 1 showing how the child seat module is moved between the deployed position and the stowed position.
Figure 4C:
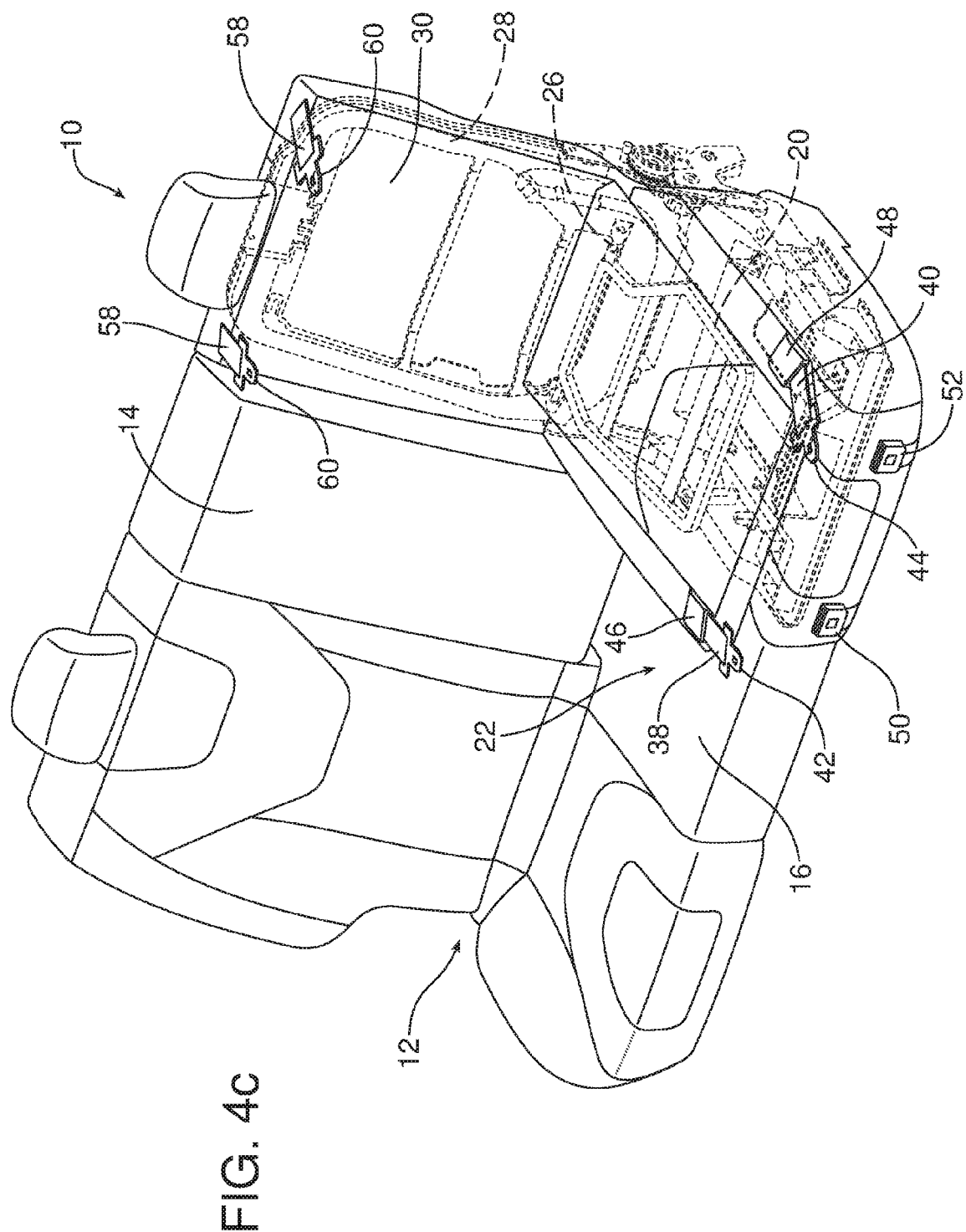
FIG. 4c is a detailed perspective view of the vehicle seat assembly illustrating the child seat module in the deployed position and showing the main frame and folding frame member in phantom line.

As best illustrated in FIGS. 1, 3 and 4c, the child seat module 18 includes a stationary child seat back 30 that is carried on or secured to the main frame 28. The vehicle seat back 14 includes a section 32 carried on a first or front side of the folding frame member 20. In addition, the child seat module 18 includes a child seat bottom 36 carried on a second or rear side folding frame member 20. When the child seat module 18 is deployed for use, the folding frame member 20 is pivoted downward until the seat back section 32 rests on the seat bottom 16 thereby exposing the child seat module for use. In contrast, when the child seat module 18 is displaced into the stowed position, the folding frame member 20 is pivoted upwardly until the child seat module is fully concealed behind the seat back section 32 which forms a part of the seat back 14 of the vehicle seat 12. FIG. 2 is a side elevational view illustrating the displacement of the folding frame member 20 and, therefore, the child seat module 18 between the deployed and stowed positions. FIGS. 1 and 4c illustrate the child seat module 18 in the deployed position while FIG. 3 illustrates the child seat module in the stowed position.

In the illustrated embodiment, the anchor system 22 comprises a first length of webbing 38 and a second length of webbing 40. A first tongue 42 is connected to a first end of the first length of webbing 38 while a second tongue 44 is connected to a first end of the second length of webbing 40. The second end of the first length of webbing 38 is connected to a first retractor 46 while the second end of the length of webbing 40 is connected to a second retractor 48. The two retractors 46, 48 are secured to or carried on the folding frame member 20.

As best illustrated in FIG. 1, the anchor system 22 also includes a first buckle assembly 50 and a second buckle assembly 52 carried on a body or a frame of the motor vehicle. In the illustrated embodiment the buckles 50, 52 are secured to the seat frame or to the motor vehicle floor F immediately below the front edge of the seat bottom 16. The anchor system 22 is utilized to secure the folding frame member 20 and, therefore, the child seat module 18 in the deployed position. More specifically, the first and second lengths of webbing 38, 40 are paid out from the respective retractors 46, 48 and the first and second tongues 42, 44 are engaged and secured in respective first and second buckle assemblies 50, 52. The two retractors 46, 48 include a web lock to hold the first and lengths of webbing 38, 40 in tension and thereby maintain the child seat module 18 in the deployed position even when the motor vehicle is subjected to impact forces associated with a motor vehicle accident.

When one wishes to displace the child seat module 18 from the deployed position to the stowed position, one depresses the buttons 54, 56 on respective buckle assemblies 50, 52 to release the first and second tongues 42, 44 from the buckle assemblies. The first and second retractors 46, 48 then automatically wind the first and second lengths of webbing 38, 40 onto the respective retractors. When the folding frame member 20 is then displaced into the upright or stowed position, the entire child seat module 18, as well as the first and second tongues 42, 44 are hidden within the seat back 14 behind the seat back section 32 carried on the folding frame member. See FIG. 3.

The child restraint system 24 of the child seat module 18 includes a shoulder harness including two shoulder belts 58 having tongues 60 that are received and secured in a central buckle assembly 62 projecting through the child seat bottom 36 between the legs of the child C in a manner known in the art.

As should be appreciated from the foregoing, the vehicle seat assembly 10 is useful in a method of restraining a child C. That method may be broadly described as comprising the steps of folding a portion 32 of a motor vehicle seat back 14 downward into a deployed position in order to expose a child seat 30, 36, anchoring that portion in the deployed position, placing a child C in the exposed child seat and restraining that child in the child seat. As indicated above, the seat back portion 32 is anchored in the deployed position with the child seat module 18 exposed and ready for receiving a child by extending the two lengths of webbing 38, 40 and inserting the two tongues 42, 44 into buckle assemblies 50, 52 thereby anchoring the folding frame member 20, the seat back portion 32 and the child seat bottom 36 carried thereon to the body, frame or floor of the motor vehicle.

In summary, numerous benefits are provided by the vehicle seat assembly 10 including a child seat module 18 integrally formed with the seat back 14. Advantageously, the child seat module 18 may be easily deployed when needed to restrain a child or stowed when the regular full vehicle seat 12 is needed for accommodating adults or other items. The vehicle seat assembly 10 is very easy to use and eliminates the need for purchasing an expensive child seat as well as the difficulties of handling such a child seat which is often heavy and cumbersome.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle seat assembly for a motor vehicle, comprising:
   a vehicle seat including a seat back and a seat bottom; and a child seat module integrally formed with said seat back, said child seat module including a folding frame member, an anchor system for securing said folding frame member in a deployed position, a child restraint system and a retractor, wherein the retractor tensions the anchor system to maintain the child seat module in the deployed position.

2. The vehicle seat assembly of claim 1, wherein said vehicle seat includes a main frame and said folding frame member is attached by a pivot to said main frame.

3. The vehicle seat assembly of claim 2, wherein said child seat module includes a stationary child seat back carried on said main frame.

4. The vehicle seat assembly of claim 3, wherein said seat back includes a section carried on a first side of said folding frame member.

5. The vehicle seat assembly of claim 4, wherein said child seat module includes a child seat bottom carried on a second side of said folding frame member.

6. The vehicle seat assembly of claim 5, wherein said anchor system includes at least one tie down.

7. The vehicle seat assembly of claim 6, wherein said at least one tie down includes a length of webbing.

8. The vehicle seat assembly of claim 7, wherein said anchor system further includes a tongue secured to a first end of said length of webbing and a buckle assembly carried on a body or a frame of said motor vehicle whereby said tongue is secured in said buckle assembly to secure said folding frame member in said deployed position for holding a child.

9. The vehicle seat assembly of claim 8, wherein said length of webbing having a second end secured to said retractor and being automatically wound onto said retractor when disconnected from said buckle assembly.

10. The vehicle seat assembly of claim 9, wherein said child restraint system includes a shoulder harness assembly.

11. The vehicle seat assembly of claim 1, wherein said anchor system includes at least one tie down.

12. The vehicle seat assembly of claim 1, wherein said at least one tie down includes a length of webbing.

13. The vehicle seat assembly of claim 12, wherein said anchor system further includes a tongue secured to a first end of said length of webbing and a buckle assembly carried on a body or a frame of said motor vehicle whereby said tongue is secured in said buckle assembly to secure said folding frame member in said deployed position for holding a child.

14. The vehicle seat assembly of claim 13, wherein said length of webbing having a second end secured to said retractor and being automatically wound onto said retractor when disconnected from said buckle assembly.

15. The vehicle seat assembly of claim 14, wherein said child restraint system includes a shoulder harness assembly.

16. A method of restraining a child in a motor vehicle seat, comprising:

folding a portion of a motor vehicle seat back downward into a deployed position in order to expose a child seat;

extending a length of webbing from a first retractor carried on said portion and inserting a first tongue on a first end of said first length of webbing into a first buckle assembly anchored to a body or a frame of said motor vehicle;

anchoring said portion in said deployed position;

placing a child in said exposed child seat; and restraining said child in said child seat.

17. The method of claim 16, including extending a second length of webbing from a second retractor carried on said portion; and inserting a second tongue on a first end of said second length of webbing into a second buckle assembly anchored to said body on said frame of said motor vehicle.

18. A vehicle seat assembly for a motor vehicle, comprising:

a vehicle seat including a seat back and a seat bottom; and a child seat module integrally formed with said seat back, said child seat module including a folding frame member, an anchor system for securing said folding frame member in a deployed position and a child restraint system, wherein said anchor system includes a first length of webbing, a second length of webbing, a first tongue connected to a first end of said first length of webbing, a second tongue connected to a first end of said second length of webbing, a first buckle assembly carried on a body or a frame of said motor vehicle and a second buckle assembly carried on said body or said frame of said motor vehicle wherein said first tongue is secured in said first buckle assembly and said second tongue is secured in said second buckle assembly to secure said folding frame member in said deployed position for holding a child.

19. The vehicle seat assembly of claim 18, wherein said child seat module further includes a first retractor and a second retractor wherein a second end of said first length of webbing is secured to said first retractor and a second end of said second length of webbing is secured to said second retractor whereby said first length of webbing is automatically wound onto said first retractor and said second length of webbing is automatically wound on said second retractor when disconnected from said first buckle assembly and said second buckle assembly.

* * * * *